United States Patent
Karlsson

(10) Patent No.: US 8,401,750 B2
(45) Date of Patent: Mar. 19, 2013

(54) METHOD AND DEVICE FOR AUTOMATIC OR SEMIAUTOMATIC SELECTION OF A BETTER STARTING GEAR IN A VEHICLE

(75) Inventor: Lars Karlsson, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 329 days.

(21) Appl. No.: 12/919,824

(22) PCT Filed: Feb. 28, 2008

(86) PCT No.: PCT/SE2008/000165
§ 371 (c)(1), (2), (4) Date: Sep. 9, 2010

(87) PCT Pub. No.: WO2009/108087
PCT Pub. Date: Sep. 3, 2009

(65) Prior Publication Data
US 2011/0010060 A1    Jan. 13, 2011

(51) Int. Cl.
*F16H 61/02* (2006.01)
(52) U.S. Cl. ............................................ 701/58; 701/65
(58) Field of Classification Search .................. None
See application file for complete search history.

(56) References Cited

U.S. PATENT DOCUMENTS 6,953,410 B2 * 10/2005 Wheeler et al. ............... 475/115
2006/0079373 A1   4/2006 Nishio et al.
2006/0079377 A1 * 4/2006 Steen et al. ................... 477/186

FOREIGN PATENT DOCUMENTS

WO    0242108 A1   5/2002

OTHER PUBLICATIONS

International Search Report for corresponding International Application PCT/SE2008/000165, dated Oct. 22, 2008.
International Preliminary Report on Patentability for corresponding International Application PCT/SE2008/000165, dated Mar. 5, 2010.

* cited by examiner

*Primary Examiner* — Michael J. Zanelli
(74) *Attorney, Agent, or Firm* — WRB-IP LLP

(57) ABSTRACT

Method and a device for automatic selection of a better starting gear in a vehicle, including the steps of engaging a first starting gear, on driver demand controlling propulsion torque as to attempt to achieve a first take off, if the first starting gear is too high interrupting the first take off and automatically braking the vehicle, engaging a second adapted starting gear which is a lower gear compared to the first starting gear, controlling propulsion torque as to attempt to achieve a second vehicle take off, and if the second vehicle take off attempt results in a transmitting of torque to driven wheels of the vehicle being enough as to perform a take off then stop braking the vehicle. An incorrectly selected starting gear can thus be automatically changed. The starting gear change can be performed in an uphill situation.

9 Claims, 4 Drawing Sheets

METHOD AND DEVICE FOR AUTOMATIC OR SEMIAUTOMATIC SELECTION OF A BETTER STARTING GEAR IN A VEHICLE

BACKGROUND AND SUMMARY

The present invention relates to a method for automatic or semiautomatic selection of a better starting gear in a vehicle.

The invention also relates to a vehicle comprising a control unit arranged to perform steps for automatic or semiautomatic selection of a better starting gear.

The invention also relates to a computer program and computer program products for carrying out said method.

Automatic Mechanical Transmissions (AMT:s) have become ever more common in heavier vehicles with the increasing development of microprocessor systems, making it possible, with a control computer and a number of control devices, such as servomotors, for example, to precisely regulate the engine speed, engagement and disengagement of an automatic disc clutch between engine and gearbox, and gearbox clutch members in relation to one another, so that smooth gear changes are always achieved at the correct engine speed.

A gearbox of the AMT-type usually comprises an input shaft, an intermediate shaft, which has at least one toothed gear meshing with a toothed gear on the input shaft, and main shaft with toothed gears, which mesh with toothed gears on the intermediate shaft. The main shaft is then further connected to an output shaft coupled to the driving wheels via a propeller shaft, for example. Each pair of toothed gears has a different gear ratio from another pair of gears in the gearbox. Different transmission ratios are obtained in that different pairs of gears transmit the torque from the engine to the driving wheels.

The development of computer technology has also had an impact on electronic control and feedback systems for a vehicle engine, and these systems have become more precise, faster and more adaptable to prevailing engine and environmental conditions. The entire combustion process can be precisely controlled according to any operating situation. The vehicle's throttle lever (an accelerator pedal, for example), which primarily controls the fuel supply to the engine, controls the vehicle's engine via electrical wiring and electronic signals. The throttle lever is therefore equipped with sensors for detecting the throttle lever position, that is to say what throttle opening is required.

In the process of vehicle take off an automatic disc clutch as described above is included in the AMT and is usually controlled by means of information on the position of the throttle lever, the rotational speed of the engine, the engine output torque, the position of the disc clutch and from a reference position of the disc clutch, which is selected on the basis of when the disc clutch just begins to transmit torque (traction position), this position being relatively easy to define. A torque typically transmitted in the reference position may be in the order of 30 Nm. The engine output torque is mostly calculated from the quantity of fuel injected into the engine. In the starting sequence and maneuvering the vehicle is typically started from stationary or a virtually stationary state, and the engine commences the sequence at idling speed. The position of the disc clutch and hence the degree of engagement, which determines the torque transmitted from the engine to the gearbox, primarily depends on where the driver positions the throttle lever. The reference position of the disc clutch is used to give the driver of the vehicle more accurate control of the vehicle take off in that the disc clutch assumes the reference position immediately a starting gear is selected and engaged. The vehicle is prepared for immediate take off.

Thus in many situations the driver experiences only a small flat spot, if any, when the accelerator pedal is depressed. The driver therefore obtains a theoretically direct response and the vehicle in principle starts to move as soon as the accelerator pedal starts to be depressed.

The selection of an appropriate starting gear in an AMT is normally based on a calculation from at least parameters such as road inclination and vehicle weight. Even though this calculation covers a lot of vehicle starting situations a selected starting gear will sometimes not become right due to a changed vehicle condition, which the calculation cannot foresee. One such situation can be when a long-distance truck has been parked with the truck on a horizontal part of the road and the trailer in a down slope. From a starting gear selection point of view this situation can get even worse if the trailer and truck when parked are empty and then the trailer is loaded before a take-off. Such a calculation will probably not take into account the weight change of the trailer and that it is parked in a down slope. This will most likely make the AMT to select a too high starting gear and an unsuccessful vehicle take off is most likely to happen due to the weight increase of the trailer and in that the trailer is parked in a down slope that counteracts propulsive power. The driver will have to interrupt an unsuccessful take off attempt and hinder the truck from rolling backwards by, for example, activating the service brakes. Then a more proper starting gear will have to be selected manually since the AMT control unit will not know about the changed condition.

WO0242108 discloses and example of a starting gear selection procedure where successive downshifting is performed if not sufficient vehicle acceleration can be performed with a first engaged starting gear.

There is therefore a need to make it easier for the driver to handle such take offs as mentioned above.

The method according to an aspect of the invention describes a method for automatic or semiautomatic selection of a better starting gear in a vehicle. The method is characterized by the following steps executed in mentioned order:

selecting and engaging a first vehicle starting gear at vehicle stand still, on driver demand controlling vehicle propulsion torque by gradually engaging a propulsion unit to driven wheels of the vehicle as to attempt to achieve a first vehicle take off, detecting if said first vehicle starting gear is too high for a prevailing condition of the first vehicle take off, if the first vehicle starting gear is too high then interrupting the first vehicle take off and automatically braking the vehicle, disengaging said first vehicle starting gear, selecting and engaging a second adapted starting gear which is a lower gear compared to said first starting gear and having a higher gear ratio, controlling vehicle propulsion torque by gradually engaging said propulsion unit to said driven wheels as to attempt to achieve a second vehicle take off, and if said second vehicle take off attempt results in a transmitting of torque to driven wheels of the vehicle being enough as to perform a take off then stop braking the vehicle.

The advantage of the method according to an aspect of the invention is that a wrongly selected starting gear is automatically or semi automatically changed. A further advantage is that the starting gear change can be performed in an uphill situation. Thus, it will be possible to change the wrongly selected starting gear without risking that the vehicle is rolling off in the wrong direction.

According to an advantageous second embodiment of the method according to an aspect of the invention the step of detecting that said first vehicle take off is not possible with said first starting gear is done by calculating heat energy developed in the clutch during the first vehicle take off attempt and interrupting said first vehicle take off attempt if said heat energy exceeds a predetermined heat energy limit. This is an advantageous way of detecting if a starting gear was wrongly selected.

According to an advantageous further embodiment of the method according to an aspect of the invention the step of detecting that said first vehicle take off is not possible with said first starting gear can be done by the driver. The subsequent step of interrupting the first vehicle take of can be performed manually by the driver. This gives increased operational freedom to the driver. The step of interrupting the first vehicle take off can be performed by the driver manually selecting a lower gear by, for example, operating a gear shift lever.

According to an advantageous further embodiment of the method according to an aspect of the invention if said second take off attempt results in transmission of torque to the driven wheels enough to keep the vehicle at least in stand still, then continuing controlling clutch engagement of a clutch until the clutch is fully engaged and the vehicle takes off. This point in the engagement is a further indication of a successful starting gear selection and clutch engagement process.

BRIEF DESCRIPTION OF THE DRAWINGS

The present invention will be described in more detail below with reference to the drawings attached, which by way of example show further preferred embodiments of the invention.

DETAILED DESCRIPTION

Figure 1:
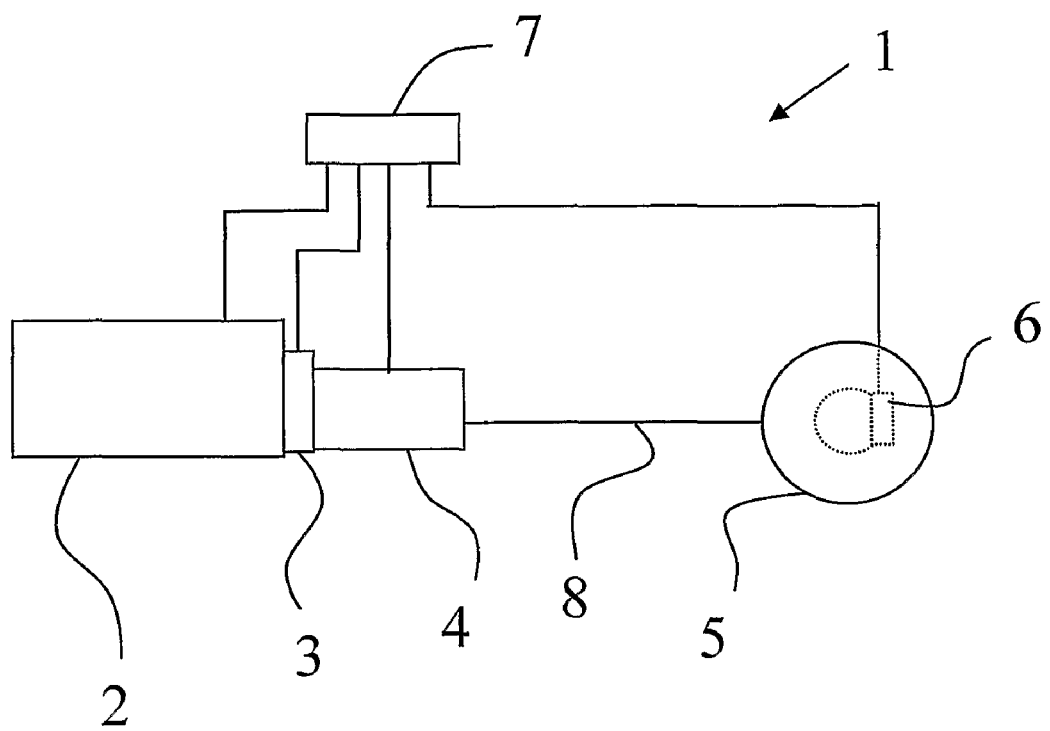
FIG. 1 shows a schematic diagram of an embodiment of a device according to an aspect of the invention.

FIG. 1 schematically discloses a drive train 1 of a vehicle with braking device 6, which in the shown example is arranged to brake driven wheel 5 of the vehicle. Said wheel 5 is driven by a propulsion unit 2 via a stagegeared automatic transmission 3, 4 and a propeller shaft 8 in a known way. The automatic transmission can comprise of; a clutch 3 and an automated manual transmission (AMT) 4, or a double clutch transmission (DCT) 3 and 4, or a torque converter 3 and an automatic gearbox 4. Said propulsion unit can be a combustion engine or a combination of a combustion engine and an electric motor/generator, so called hybrid electric vehicle (HEV). The braking device 6 is in the shown example disclosed as a service brake, which for example can be controlled by the driver of the vehicle through a brake pedal (not shown) in a known way. For the invention it is also possible to use other braking devices in the vehicle in combination with the service brake or instead of said service brake, such as auxiliary brakes or electric brakes (for example said motor/generator) to stop the vehicle.

A control unit 7 can be arranged to control the propulsion unit 2 and its torque output, the automatic transmission 3, 4 and the braking device 6 in accordance with different input signals such as rotational speeds of propulsion unit, rotational speeds of input/output shaft of said transmission, selected gear in the transmission and driver input through for example an accelerator pedal and a brake pedal in a known way. Said control unit can in an alternative embodiment comprise of two or several control units connected for example through a network. Said controlling functions according to the invention can be divided between said control units.

According to one embodiment of the invention, the control unit 7 is programmed to select and engage a first vehicle starting gear at vehicle stand still and said transmission being disengaged from the propulsion unit 2. See S2 in flow chart in FIG. 2, where the control sequence starts in S1. A starting gear can for example be automatically selected and engaged if the driver has chosen an automatic mode through a gear shift lever (not shown). It can also be possible for the driver to make a manual selection of the starting gear, even though the engagement as such of the gear is performed by the control unit. The meaning of the transmission 3, 4 being disengaged from the propulsion unit can for example be a disengaged clutch 3, arranged between the propulsion unit and a stagegeared transmission (DCT or AMT with a clutch) or a torque converter empty of oil, meaning that the torque converter will not transmit any torque from the propulsion unit to the stagegeared transmission. The control unit 7 is further programmed to, on driver demand for example through the accelerator pedal, control vehicle propulsive torque produced by said propulsion unit and engagement of said transmission to the propulsion unit in such a way as to attempt to achieve a first vehicle take off (S3 in FIG. 2). The take off attempt as such is performed in a known way. Thus, the propulsion unit is gradually engaged with the transmission and more and more torque delivered by the propulsion unit is transmitted to the driven wheel. If the first starting gear is too high, that is, the gear ratio is to low, there will be excessive clutch wear if the transmission comprises of a lamella type clutch, such as in an AMT with an automated clutch or a DCT. A measure of this wear can be to calculate heat energy created during clutch slip. This can be done by taking the torque and multiply with the rotational speed difference over the clutch and integrate the multiplied sum over time. If the calculated heat created during the clutch slip of the first vehicle take off is over a predetermined value the control unit is according to the invention programmed to detect this as said first starting gear being a to high starting gear (S4 and "Yes" in FIG. 2). Thus, the first starting gear is wrongly selected for the prevailing vehicle starting situation. If the starting gear is not too high then the control unit is programmed to complete the take off attempt (S5 and "No" in FIG. 2).

Figure 2:
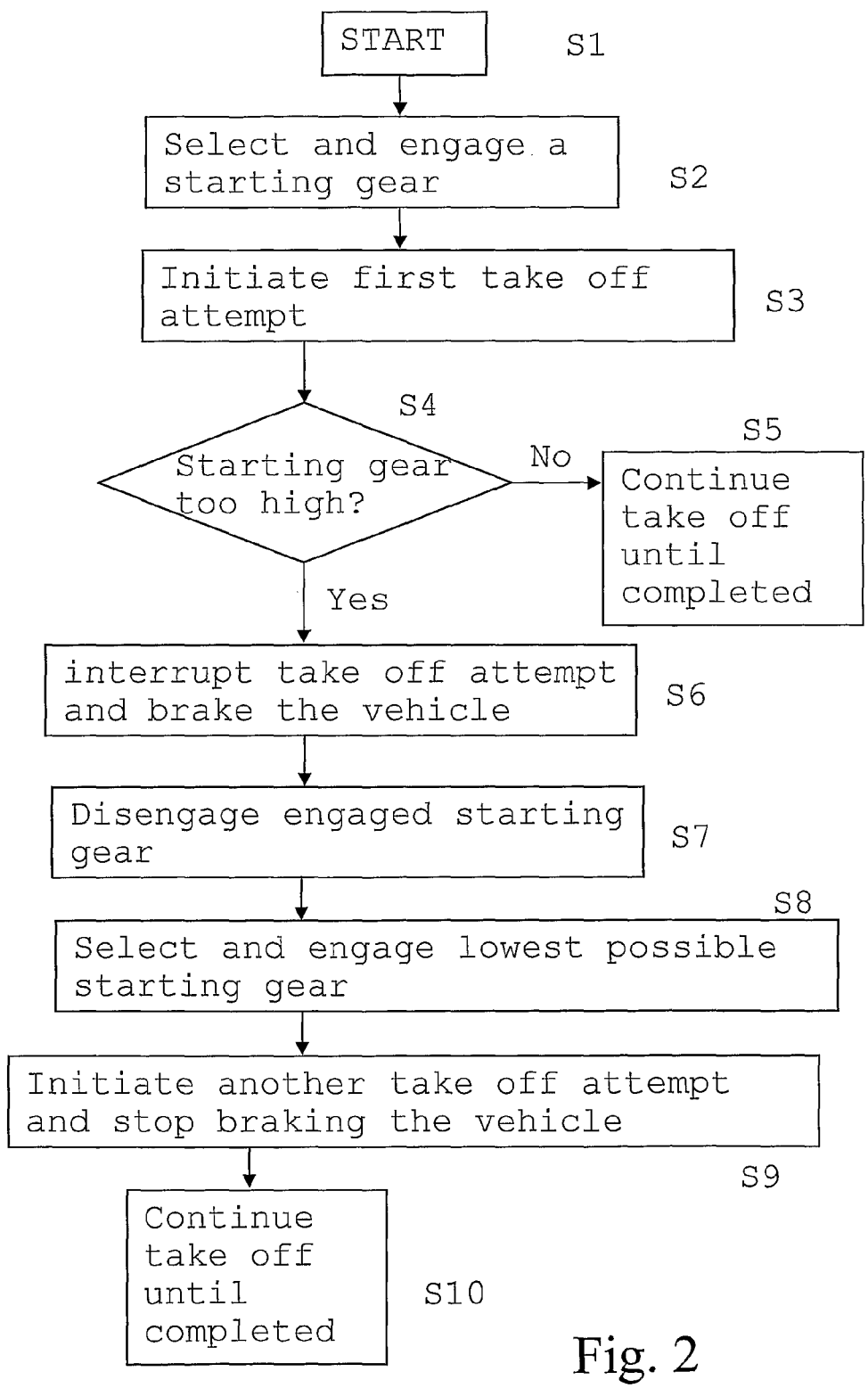
FIGS. 2 and 3 show two different flow charts disclosing the different steps of two different embodiments of the invention.

If the starting gear is too high, the control unit 7 will then automatically interrupt (S6) the first vehicle take off and brake the vehicle by activating said braking device and then disengaging (S7) said first vehicle starting gear. When the braking device is activated the vehicle is stopped and/or hindered from rolling in the opposite travel direction compared to the selected travel direction, for example when starting in an uphill. When the first starting gear is disengaged the control unit is programmed to select and engage a second vehicle starting gear which is a lower gear compared to said first starting gear (S8), thus this second starting gear has a higher gear ratio compared to the first starting gear. In one embodiment of the invention the control unit can be programmed to directly select the lowest possible starting gear after a first interrupted take off attempt. When the second starting gear is engaged the control unit is programmed to start a second vehicle take off attempt (S9) by controlling propulsive torque produced by said propulsion unit and engagement of said transmission in such a way as to achieve a second vehicle take off The sequence in FIG. 2 is ended by the completion of the second take off attempt with the lowest possible starting gear.

The first vehicle take off attempt was initiated by the driver maneuvering, for example an accelerator pedal, and demanding a certain torque output from the propulsion unit. This driver input tells the control unit to control the propulsion unit and the clutch (or torque converter) in a predetermined way. The driver has the possibility to continue demanding the same torque output before the second take off attempt, thus the driver can continue demanding the same torque output during said both take off attempts. If said second vehicle take off attempt results in a transmission of torque to the driven wheel 5 enough to perform a take off then the control unit is according to the invention programmed to inactivate said braking device 6 (see also S9). The inactivation of the braking device can be done gradually in a predefined controlled way and follow the gradual increase of transmitted torque to the driven wheel. Said controlled inactivation of the braking device is known as such. Also during the second take off attempt the clutch wear can be measured by calculating heat energy and compared to a predetermined value. If the calculated heat energy value is below the predetermined value and the transmission of torque to the driven wheel 5 is enough as to keep the vehicle at least in stand still and the braking device 6 has been inactivated, then said control unit is programmed to continue to engage the clutch until it is fully engaged and the vehicle will take off.

Figure 3:
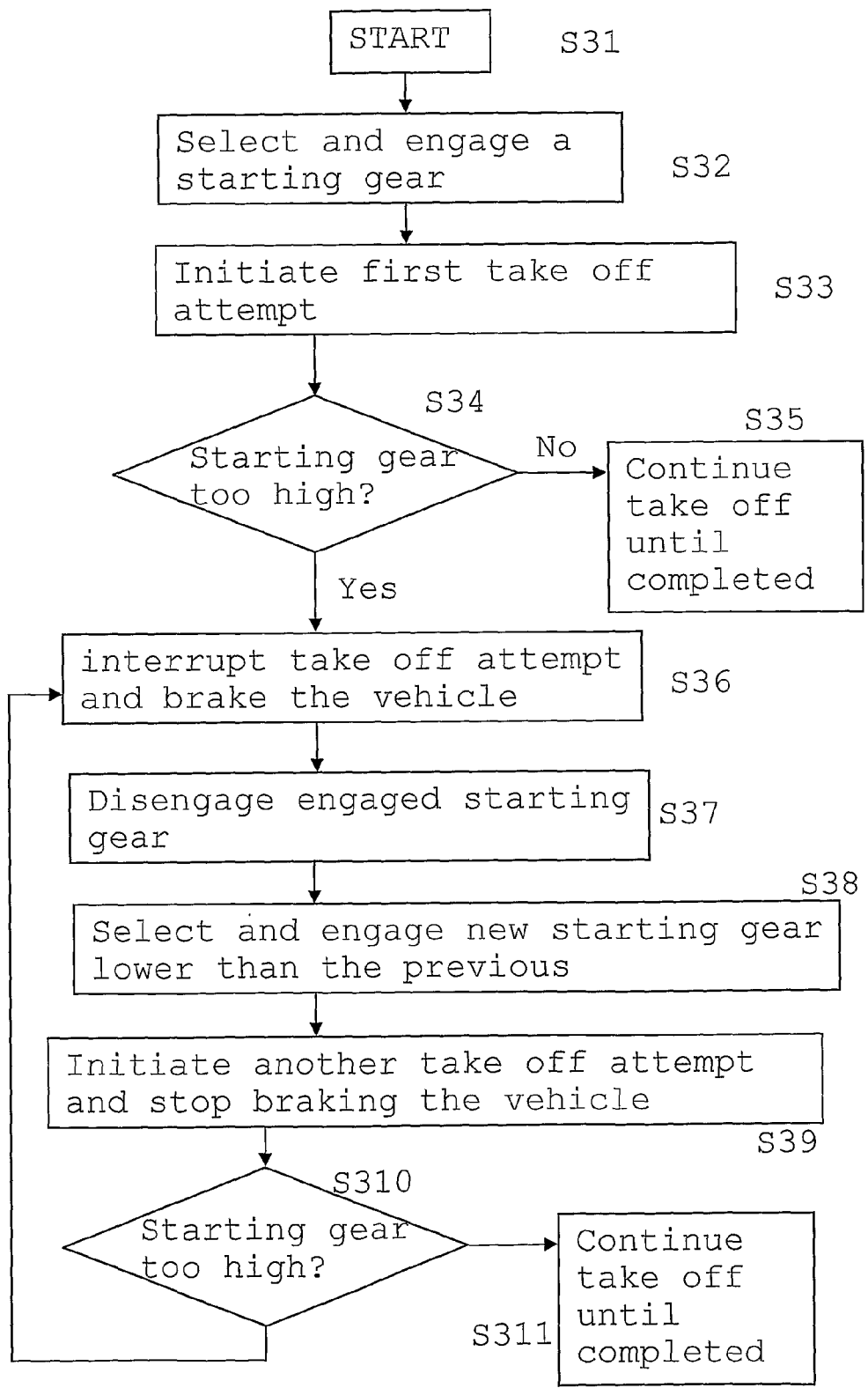

In one alterative embodiment of the invention disclosed in FIG. 3 the above starting process can be repeated until the lowest gear has been selected and tried for take off. Thus, the starting gear can be lowered one gear step at a time. In FIG. 3 step S31 to S39 correspond to steps S1 to S9 in FIG. 2. One difference is that in the sequence of FIG. 3 in step S38 not the lowest possible starting gear is selected but instead the next lower starting gear. In step S310 in FIG. 3 the control unit is programmed to detect if the second starting gear also is too high or not. If not the take off attempt continues in S311 until completed, if yes then the control unit is programmed to go back to step S36 and interrupt the take off attempt and prepare for another take off attempt with an even lower starting gear.

In a further embodiment of the invention the control unit can be programmed to interpret how had the first take off attempt was and as a result select an adapted lower second starting gear. For example if the first take off attempt is performed with gear three, the control unit can choose between gear two or gear one before the second take off attempt. The choice between the mentioned starting gears can be decided by the control unit being programmed to again calculate heat energy during the clutch slip and as further information also register the rotational speed of an input shaft of the gearbox in the transmission. In this way the control unit can assess how close to success this take off attempt was. If the rotational speed of the input shaft was relatively low then gear one (in this case the same as the lowest possible) will be selected as the new starting gear. If the rotational speed of the input shaft was relatively high then gear two will be selected as the next starting gear.

A further input that can be considered by the control unit 7 in all mentioned embodiments of the invention can be the rotational speed of the propulsion unit, that is, the rotational speed decides which torque output that is available from the propulsion unit in order to be able to transmit a certain amount of torque to the drive wheels to be able to reach a successful vehicle take off.

In an alternative embodiment of the invention according to FIG. 2 the step S3 of detecting that said first vehicle take off is not possible with said first starting gear can be detected by the driver instead. Thus, if the driver notices that the selected and engaged starting gear is too high the driver can interrupt the take off attempt by, for example, directly select another starting gear through a gear shift lever. The driver can choose the lowest possible gear (corresponding to step S8) or just select a lower gear than the first starting gear (corresponding to step S38). This manual interruption and starting gear selection initiates the control unit 7 to automatically perform steps corresponding to steps S6 to S10.

In a further embodiment it is possible for the driver to change the selected starting gear before the take oft attempt has even started, that is, before the driver requesting take off for example by pressing the accelerator pedal. Such an embodiment will thus upon manual selection of a lower second starting gear automatically initiate the control unit 7 to perform steps corresponding to steps S6 to S10.

The mentioned two semiautomatic driver initiated embodiments of the invention can be combined with each other or with the above described fully automatic embodiments of the invention for selecting a better starting gear.

Of coarse there can be embodiments of the invention where a vehicle only has functionality according to the above described fully automatic embodiments of selecting a better starting gear.

In all the above mentioned embodiments, if the lowest gear is not possible to start with without risking severe transmission wear the control unit can be programmed to warn the driver.

Figure 4:
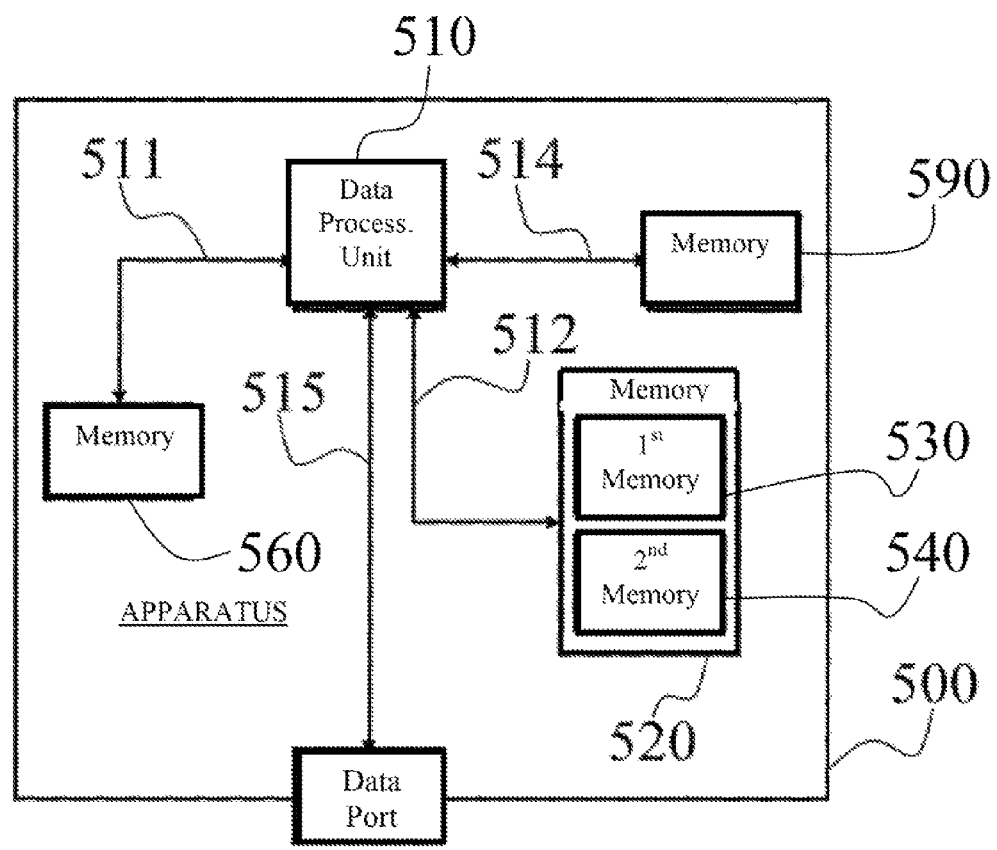
FIG. 4 shows diagrammatically a computer device that is used according to an embodiment of the invention.

FIG. 4 shows an apparatus 500 according to one embodiment of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can he an operating system. The apparatus 500 can he enclosed in, for example, a control unit, such as the control unit 7. The data-processing unit 510 can comprise, for example, a microcomputer.

The memory 520 also has a second memory part 540, in which a program for controlling the engine, the clutch, the transmission and the braking device according to the invention is stored. In an alternative embodiment, the program with functions according to the invention is stored in a separate nonvolatile storage medium 550, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile storage medium 550.

The data-processing unit 510 is tailored for communication with the storage memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile storage medium 550.

The invention should not be deemed to be limited to the embodiments described above, but rather a number of further variants and modifications are conceivable within the scope of the following patent claims.

The invention claimed is:

1. A method for automatic or semiautomatic selection of a better starting gear in a vehicle, comprising the following steps executed in mentioned order:
   selecting and engaging a first vehicle starting gear at vehicle stand still,
   on driver demand controlling vehicle propulsion torque by gradually engaging a propulsion unit to driven wheels of the vehicle as to attempt to achieve a first vehicle take off,
   detecting if the first vehicle starting gear is too high for a prevailing condition of the first vehicle take off,
   if the first vehicle starting gear is too high then interrupting the first vehicle take off and automatically braking the vehicle,
   disengaging the first vehicle starting gear,
   selecting and engaging an adapted second starting gear which is a lower gear compared to the first starting gear and having, a higher gear ratio,
   controlling vehicle propulsion torque by gradually engaging the propulsion unit to the driven wheels as to attempt to achieve a second vehicle take off,
   and if the second vehicle take off attempt results in a transmitting of torque to driven wheels of the vehicle being enough as to perform a take off then stop braking the vehicle.

2. The method as claimed in the preceding claim, wherein the step of detecting is done by calculating heat energy developed in the clutch during the first vehicle take off attempt and interrupting the first vehicle take off attempt if the heat energy exceeds a predetermined heat energy limit.

3. The method as claimed in claim 1, wherein the step of detecting is done by the driver and in that the subsequent step of interrupting the first vehicle take off is performed manually by the driver.

4. The method as claimed in the preceding claim, wherein the step of interrupting the first vehicle take off is performed by the driver manually selecting a lower gear.

5. The method as claimed in one of the preceding claims, wherein if the second take off attempt results in transmission of torque to the driven wheels enough to keep the vehicle at least in stand still, then continuing controlling vehicle propulsion torque by controlling clutch engagement of a clutch until the clutch is fully engaged and the vehicle takes off.

6. A computer programmed with program code for executing the method as claimed in claim 1.

7. A computer program product on a tangible medium comprising a program code, stored on a computer-readable medium, for executing the method as claimed in claim 1.

8. A computer program product directly loadable into an internal memory in a computer, which computer program product comprises a computer program for executing the method as claimed in claim 1.

9. A vehicle comprising a propulsion unit drivingly connected to a stage geared automatic transmission, which is drivingly connected to driven wheels of the vehicle, a braking device arranged to be able to stop the vehicle, at least a control unit arranged to control the propulsion unit, the automatic transmission and the braking device in dependence of different input signals, wherein the control unit is arranged to execute the following steps in mentioned order:
   select and engage a first vehicle starting gear at vehicle stand still and when the transmission is disengaged from the propulsion unit,
   on driver demand control vehicle propulsive torque produced by the propulsion unit and engagement of the transmission to the propulsion unit by gradually engaging the propulsion unit to the driven wheels as to attempt to achieve a first vehicle take off,
   detect if the first vehicle starting gear is too high for a prevailing condition of the first vehicle takeoff,
   if the first vehicle starting gear is too high then interrupt the first vehicle take off and automatically brake the vehicle by activation of the braking device,
   disengage the first vehicle starting gear,
   select and engage an adapted second vehicle starting gear which is a lower gear compared to the first starting gear and which has a higher gear ratio,
   control vehicle propulsive torque produced by the propulsion unit and engagement of the transmission by gradually engaging the propulsion unit to the driven wheels as to attempt to achieve a second vehicle take off,
   if the second vehicle take off attempt results in a transmission of torque to the driven wheels enough to perform a take off then inactivate the braking device.

* * * * *